Aug. 4, 1959 R. D. WESTON ET AL 2,897,543

MULTI-PART EXTRUDER HEAD

Filed Feb. 24, 1958 7 Sheets-Sheet 1

INVENTORS
ROGER D. WESTON
BY FRED K. BARNS

C. E. Tripp
ATTY.

Aug. 4, 1959    R. D. WESTON ET AL    2,897,543

MULTI-PART EXTRUDER HEAD

Filed Feb. 24, 1958    7 Sheets-Sheet 2

INVENTORS
ROGER D. WESTON
BY FRED K. BARNS
C. E. Tripp
ATTY.

Aug. 4, 1959 R. D. WESTON ET AL 2,897,543

MULTI-PART EXTRUDER HEAD

Filed Feb. 24, 1958 7 Sheets-Sheet 3

INVENTORS
ROGER D. WESTON
BY FRED K. BARNS
C. E. Tripp
ATTY.

Aug. 4, 1959 R. D. WESTON ET AL 2,897,543

MULTI-PART EXTRUDER HEAD

Filed Feb. 24, 1958 7 Sheets-Sheet 4

INVENTORS
ROGER D. WESTON
FRED K. BARNS
BY C. E. Tripp
ATTY.

INVENTORS
ROGER D. WESTON
FRED K. BARNS
BY C. E. Tripp
ATTY.

INVENTORS
ROGER D. WESTON
FRED K. BARNS
BY C. E. Tripp
ATTY.

INVENTORS
ROGER D. WESTON
BY FRED K. BARNS
C. E. Tripp
ATTY.

United States Patent Office 2,897,543

Patented Aug. 4, 1959

2,897,543

MULTI-PART EXTRUDER HEAD

Roger D. Weston, Cuyahoga Falls, and Fred K. Barns, Akron, Ohio, assignors to The B. F. Goodrich Company, New York, N.Y., a corporation of New York Application February 24, 1958, Serial No. 716,975

7 Claims. (Cl. 18—13)

This invention relates to machines for extruding plastic materials commonly known as tube machines and, more specifically, improvements in the die head assemblies for such machines.

In extruding tread and sidewall stock for pneumatic tires, it is often customary to mount a pair of tube machines in axially opposed relation, one machine extruding the sidewall stock and the other tread cap stock, the extrusions being combined in a dual die head assembly disposed between the machines. It is important that the die head assemblies be removable for changes in sizes and for cleaning with a minimum of effort. It is a feature of this invention that the die head parts for each tube machine are removable separately and independently of one another, and without requiring shifting of the individual tube machines. Thus, the size of the die cavities for one tuber can be changed without disturbing the die head for the other tuber if desired.

The die head inserts made in accordance with this invention lend themselves readily to machining because the die inserts for each tube machine are formed with essentially planar external surfaces that fit the die insert carrier and the inserts are themselves split transversely along planar surfaces which further facilitates machining. By making both parts of the die inserts for each machine completely and independently removable, another advantage is gained in that the cavities can be formed partially in each insert pair thereby facilitating optimum design for flow of the plastic material relative to the cross-sectional contour of the cavities. Since both parts of each pair of inserts are removable, the fact that the cavities are partially formed in each part does not complicate the cleaning operation.

This construction also facilitates the cavity design for the sidewall stock that provides for progressively vertically dividing the stock into two streams by transversely splitting the stock so that optimum flow characteristics are attainable.

The manner in which these advantages are obtained will be apparent from the following detailed description of the preferred embodiment of the invention.

Figure 1:
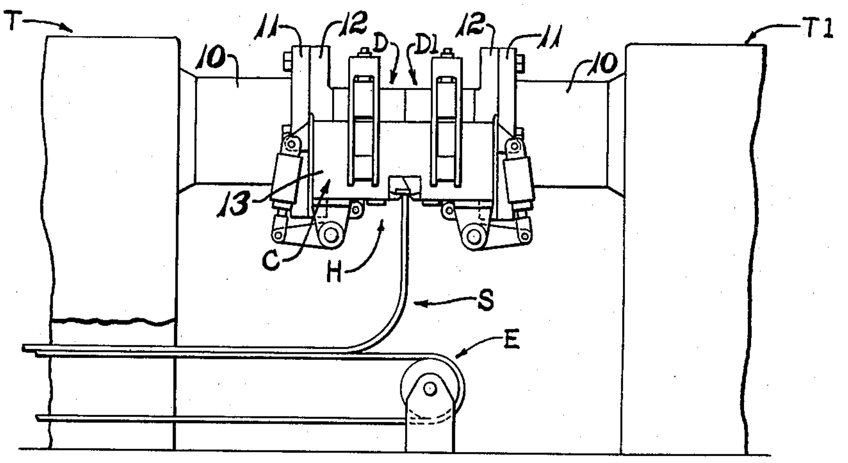
Fig. 1 is a side view of the tube machines and die assembly.

Referring to Fig. 1, a pair of tube machines is shown, machine T forming the tread cap and T1 the sidewall extrusion. As is customary, these machines are fitted with cylinders 10 in which run the usual extruding screws, not shown. End flanges 11 are provided for attaching the die assembly between the cylinders. The die assembly or head is indicated generally at H and includes a die insert carrier C bolted between the flanges and pairs of removable inserts D and D1. The extruded stock S, which includes the merged tread cap and sidewall extrusions, is carried away by a conveyor E.

Figure 2:
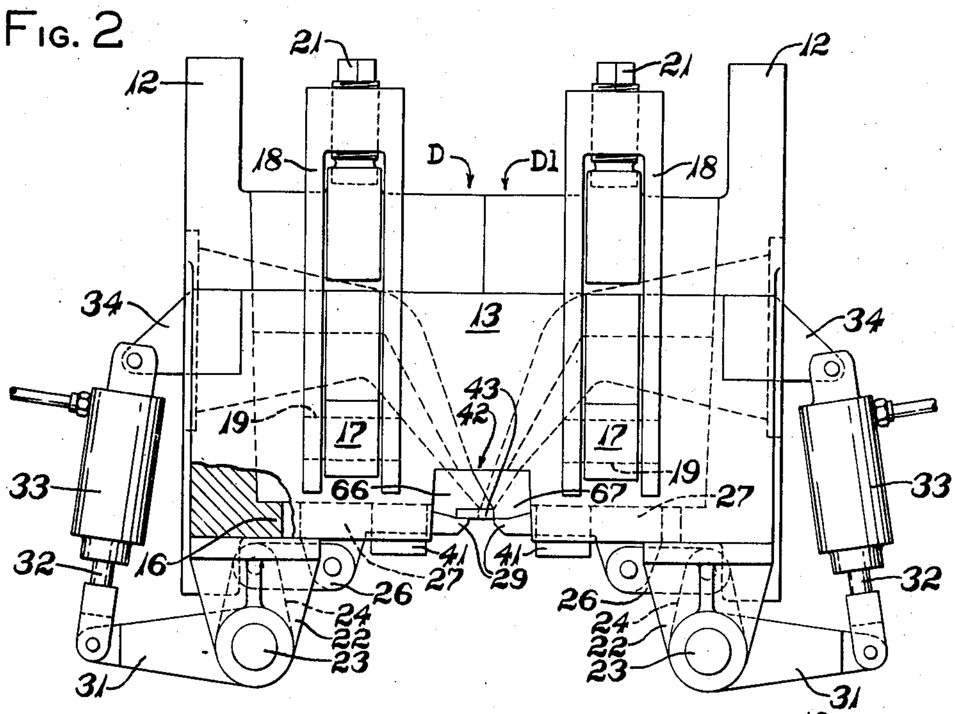
Fig. 2 is a side view of the die assembly.
Figure 5:
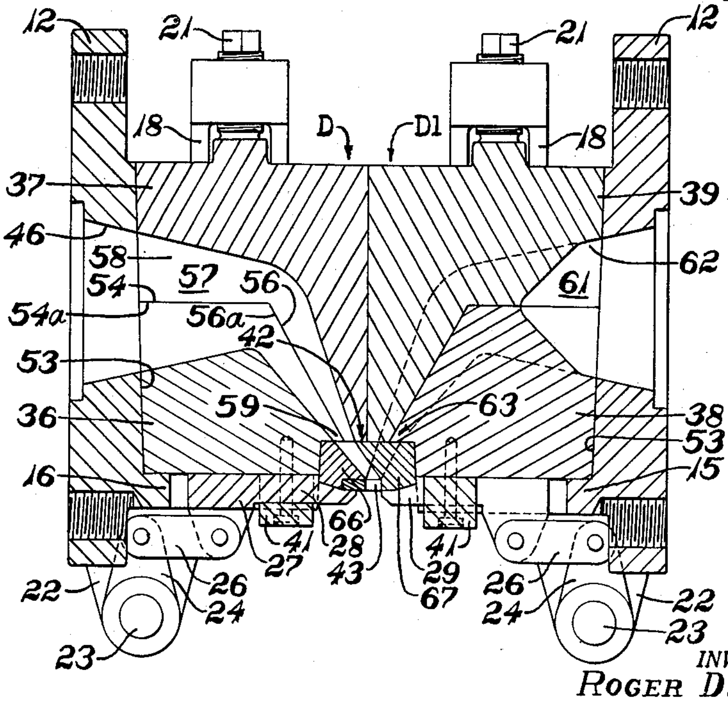
Fig. 5 is a vertical section through the die assembly.
Figure 3:
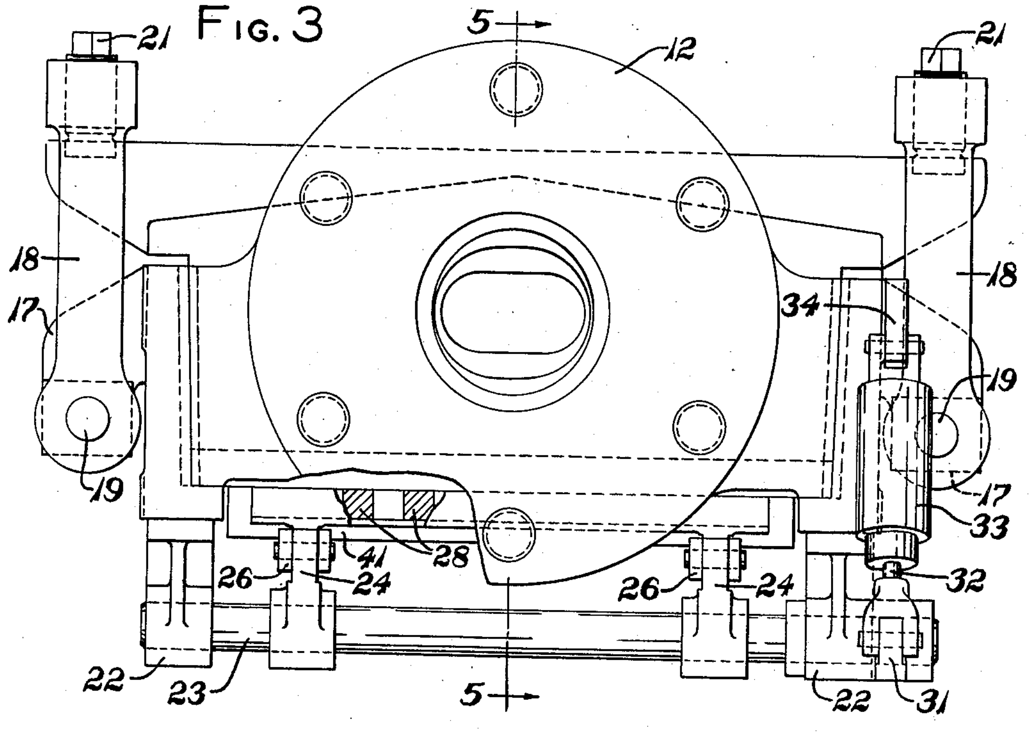
Fig. 3 is an end view of the die assembly.
Figure 4:
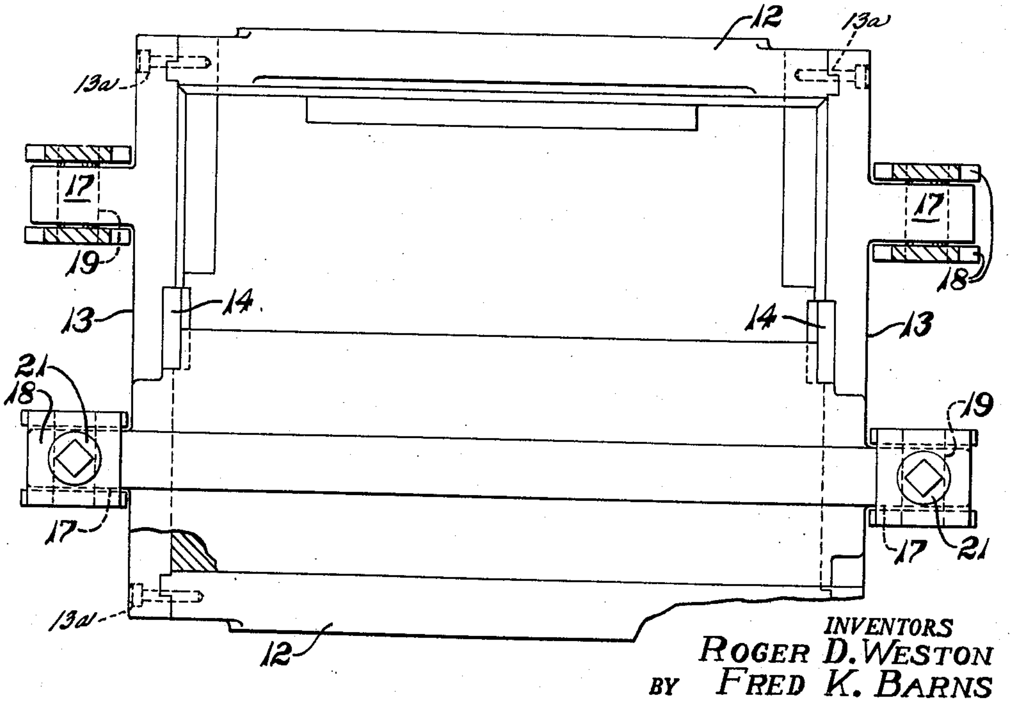
Fig. 4 is a plan view thereof with one pair of inserts removed.

The major details of the die head assembly H are seen in Figs. 2–5. Connecting the flanges 12 bolted to the cylinder flanges are side plates 13, this seen in Fig. 4. These side plates 13 are removably fastened by screws 13*a* (Fig. 4) to the end flanges 12, and plates 13 receive keys 14 which extend transversely across the inside surfaces of the plates from their upper to their lower edges. The inner surfaces of these plates 13 are tapered somewhat as are the inner surfaces of the end flanges 12. The connected plates and flanges are formed with ledges 15 and 16 that support the die insert assemblies, as seen in Figs. 4 and 5. In order to clamp the inserts in place in the carrier, the side plates 13 are provided with ears 17 to which are pivoted fork arms 18 by means of pivot pins 19. Threaded in the outer end of the arms are clamp screws 21 which press against the seats formed on the upper surfaces of the insert assemblies and retain the latter in place in the die carrier. The arrangement of the keys 14 (Fig. 4) permits removal of either of the insert assemblies D or D1 separately from the other.

Means are provided to removably fasten a joining die assembly at the outlet of the inserts. For this purpose bearing brackets 22 are fastened on the under side of the insert carrier, as best seen in Fig. 3. The shaft 23 is pivoted in the bearing brackets and has keyed thereto vertical cranks 24. These cranks also appear in Figs. 2 and 5. Horizontal links 26 connect the cranks to a joining die retaining member 27 having longitudinally spaced fingers or teeth 28 formed with beveled ends 29 for engaging the joining die. The shafts are operated by cranks 31, best seen in Fig. 2 connected to a piston rod 32 sliding in hydraulic cylinders 33. The cylinders are pivoted to ears 34 on side plates 13, the arrangement being such that the fingers 28 can be advanced toward and away from one another by operation of cylinder control valves, not shown.

Figure 8:
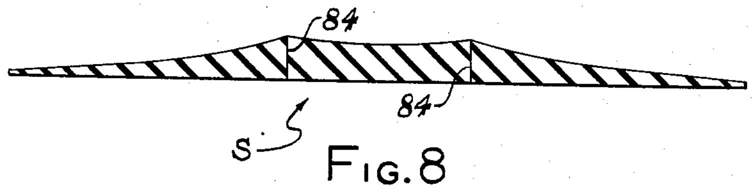

As mentioned, the cavities for each tube machine are partially formed in a pair of removable inserts D and D1. The insert D is formed of a lower portion 36 and an upper portion 37 mating therewith. There are corresponding portions 38 and 39 for the insert D1. Bolted to the lower inserts 36 and 38 are clamp bars 41 in which the retaining fingers 38, previously described, slide, there being slots formed in the clamp bars 41 to receive the fingers as seen in Figs. 3 and 5. The joining die 42, which is the die that merges the sidewall and cap stocks, is removable as can best be seen in Figs. 2 and 5. This die fits in a suitable recess formed in the main die inserts. Also, clamped in place is a contour plate 43, seen in Figs. 2 and 5, which gives the final shape to the upper surface of the extruded tread strip, the lower surface of the strip being flat, as seen in Fig. 8.

Referring to Fig. 5, each of the end flanges 12 is formed with an entrance mouth 46 that directs the stock from the extrusion cylinders into the die insert cavities. It can be seen that the die carrier is formed with tapered transverse surfaces 53 which fit corresponding surfaces on the die inserts. The lower insert 36 of the assembly D has a flat upper surface 54 mating with a corresponding surface 54a on the upper insert, as seen in Fig. 5. The lower insert has a tapered or diverging flat surface 56 mating with a corresponding flat surface 56a on the upper insert of assembly D. Cavities are formed in each insert to produce stock passage 57 for the assembly D that forms the cap strip. This passage has an entrance mouth 58 leading from the inlet mouth 46 and an exit mouth 59 leading to the joining die 42. Corresponding flat surfaces 54 and 54a and 56 and 56a are formed on the other insert D1 that produces the sidewall strip. This insert likewise has a stock passage 61 formed by cavities in each insert and has an entrance mouth 62 and two exit mouths 63, seen in Fig. 10. The passage through insert assembly D1 divides the stock into two strips, this being accomplished by mating separator stock guides 64 and 64a, best seen in Fig. 10.

Figure 13:
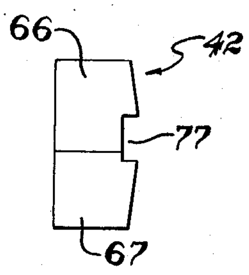
Figs. 11–15 show the joining die.
Figure 14:
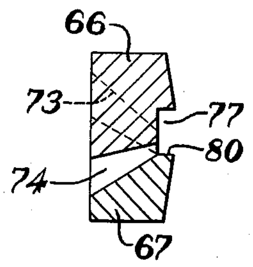
Figure 15:
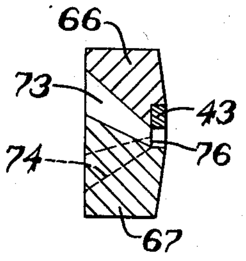
Figure 11:
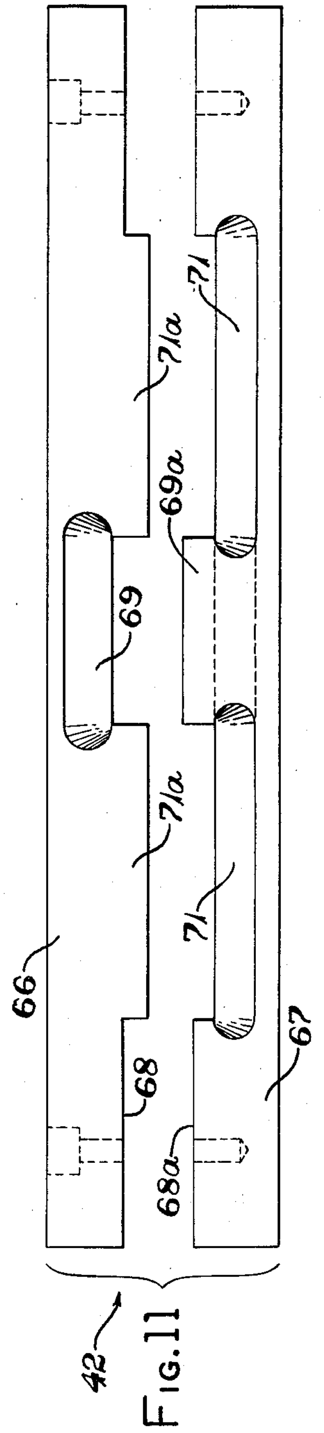
Figure 12:
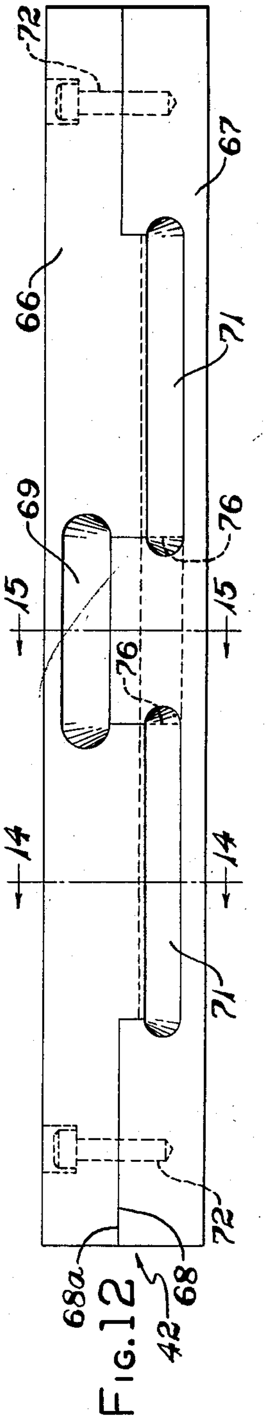
Figure 16:
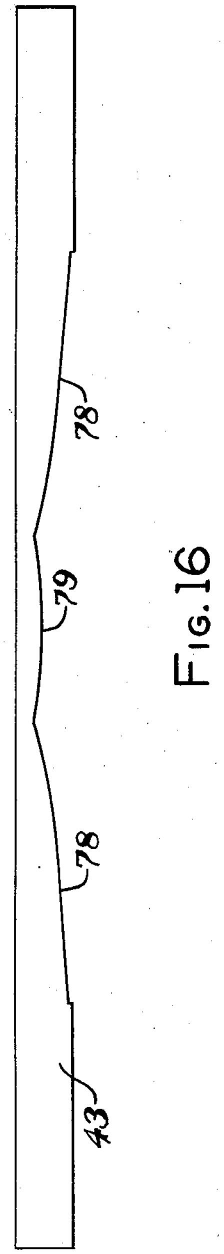
Fig. 16 shows the contour plate.

The joining die 42 is a two-part assembly shown separately in Figs. 11–15 and comprises right and left sections 66 and 67, as they are seen endwise in Figs. 2 and 5, these sections being formed with flat mating surfaces 68 and 68a best seen in Figs. 11–13. The two parts of the joining die are contoured to flatten the stock merging from the insert cavities into ribbons that are brought together edge to edge in the construction shown. Thus, a cap recess 69 is formed in the die part 66 which is covered by a projection 69a formed on the mating parts 67. Likewise, sidewall recesses 71 are formed in the die part 67 that are closed by projections 71a on the other die part 66. Two die parts are bolted together by bolts 72 resulting in cap channel 73 and sidewall channel 74, seen in Figs. 14 and 15. Stock forming the sidewall strips and cap strip is merged by bringing the channels together as best seen in Figs. 12, 14, and 15, the cap channel 73 being brought into alignment with the inner side of each sidewall channel 71 over a merging zone 76, as seen in Fig. 15, so that the stock strips are pressed laterally together and joined into a single ribbon. The upper side of the ribbon is given the desired contour by the contour plate 43 disposed in recess 77, as seen in Fig. 16, has sidewall contouring edges 78 and cap contouring edges 79. The base of the stock is flat as determined by the surface 80 formed on the joining die member 66.

Figure 17:
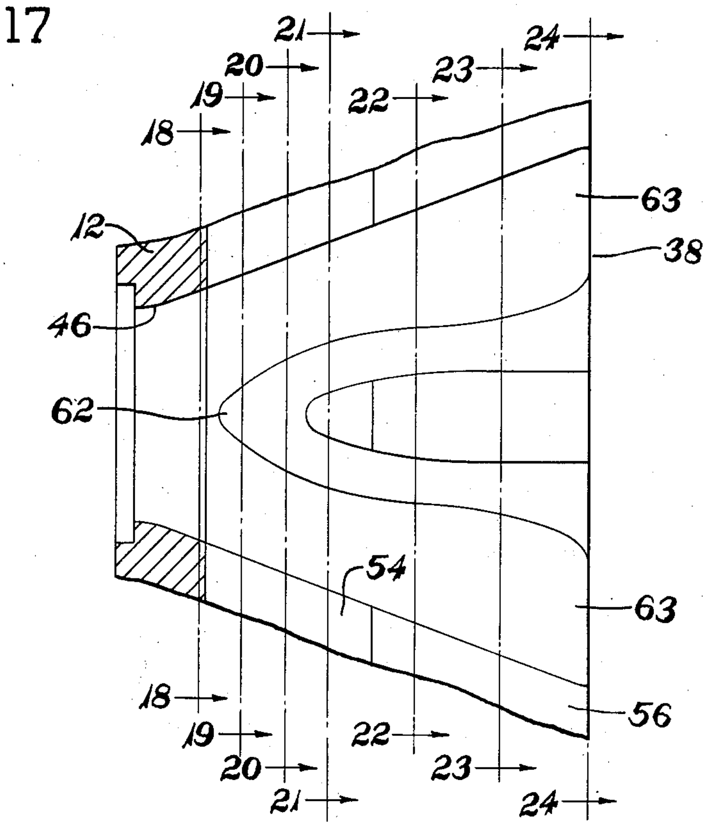
Fig. 17 is a developed view of a lower sidewall insert section.
Figure 18:
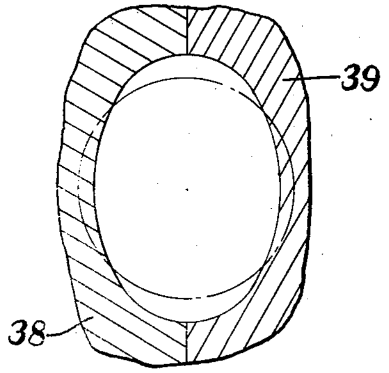
Figs. 18–24 show progressively the contour of the cavity in the sidewall forming inserts, taken on a complete die assembly as indicated on Fig. 17.
Figure 19:
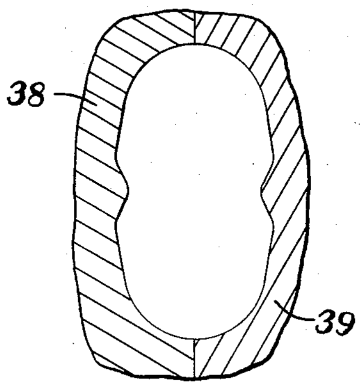
Figure 20:
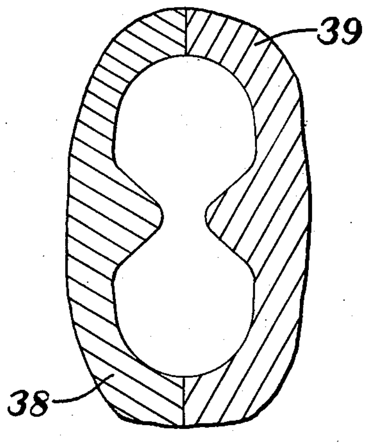
Figure 21:
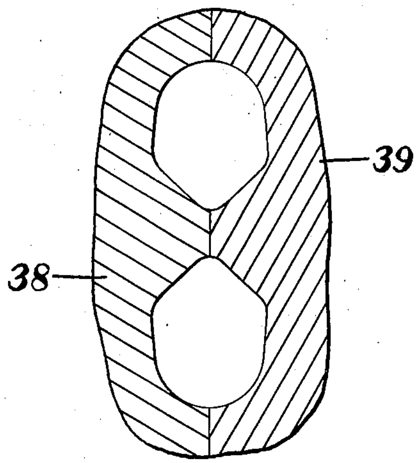
Figure 22:
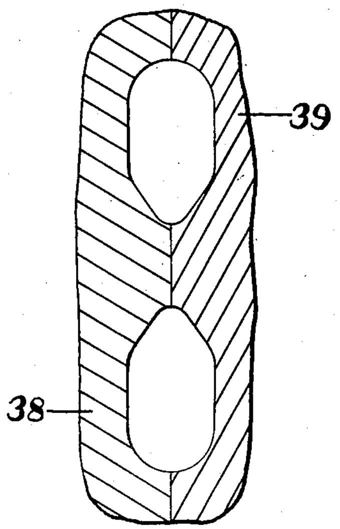
Figures 23, 24:
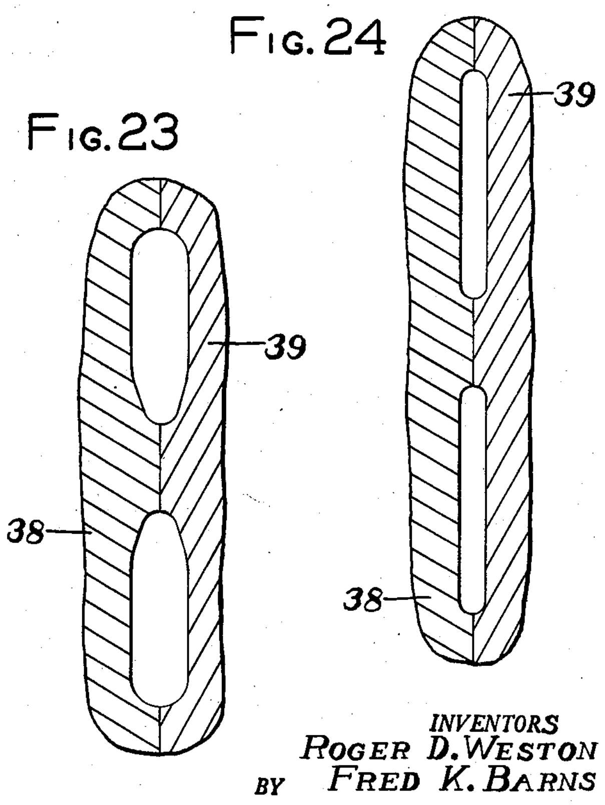

Figs. 18–24 show progressive stages in the contouring of the cavities that form the tread stock strips. Fig. 17 is a developed view on the lower insert 38 of assembly D1 and the remaining figures are contour sections taken progressively as indicated in Fig. 17. It will be seen how the stock is steadily changed by elliptical sections shown in Fig. 18 to a pair of ribbon sections shown in Fig. 24 taken at the mouth of the die assembly.

Figure 6:
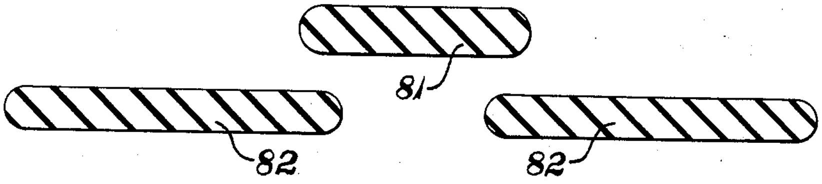
Figs. 6–8 show progressive stages in the stock formation.
Figure 7:
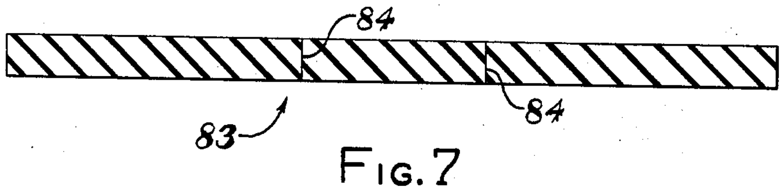

Referring to Figs. 6–8, the die insert cavity and the assembly D produces a single cap strip 81 and the sidewall stock merges from assembly D1 as two single strips 82. These strips are then forced through the passages 73 and 74 in the joining die and emerge from the die as a flat ribbon 83, Fig. 7, with the edges 84 pressed and joined together where they are brought together at the merging zones 76, these being the zones where the cap and sidewall stock strips are positioned edge to edge under pressure. The stock immediately passes under the contour plate 43 and emerges in its finished section as indicated at S in Fig. 8.

Figures 9, 10:
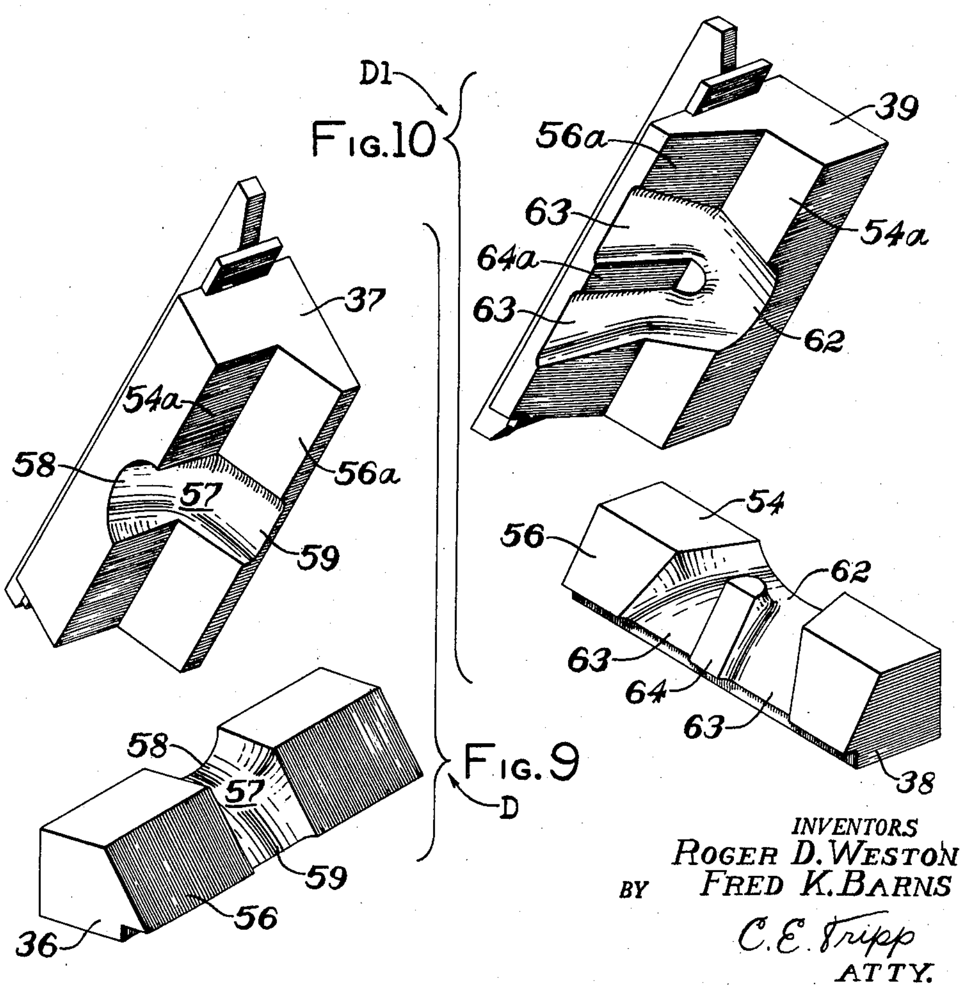
Figs. 9 and 10 are exploded views of the two pairs of die inserts.

Thus, it can be seen that one or both parts of the insert assembly D and D1 can be removed at will for cleaning and replacement. The tube machines need not be disturbed and one insert assembly is removable for cleaning, changing sizes or the like without disturbing the other insert assembly. Thus, in this operation the stock can be left in place in the insert assembly that is not removed so that the unchanged die assembly need not be disturbed or cleaned, and as soon as the new insert assembly is replaced, the machine is ready for operation. Examination of Figs. 5, 9 and 10 shows that the machining operations are relatively simple and that the basic surfaces for the insert assemblies are all planar so that relatively few expensive die sinking operations are required to produce the mating cavity forming surfaces. The cavities can be readily machined in the separable parts and since all parts are removable there is no advantage in forming the entire cavities in either the upper or lower die inserts. This results in making possible a symmetrically arranged cavity and puts no limitations upon the designer seeking to produce a cavity contour that will give maximum flow with less resistance and scorching of the stock.

The term "axially opposed" as used in the specification and claims is intended to include structures wherein the axes of the opposed tubers are in alignment as in the preferred embodiment of the invention, as well as those wherein the opposed axes may be offset somewhat as in the patent to Lehman, 2,096,362, the mode of operation and the advantages of the invention being the same in either case.

Having completed a detailed description of our invention so that those skilled in the art may practice the same, we claim:

1. A duplex die head for connection between a pair of substantially axially opposed tubers for forming and uniting strips of plastic material issuing from said tubers, said die head comprising a rigid die box member having axially opposed end wall portions for attachment to the tubers and having side wall portions inter-connecting said end wall portions, said wall portions forming an enclosed chamber with substantially planar interior walls, two cavity block assemblies in said chamber, each assembly having planar outer walls snugly engaging corresponding interior planar walls of said chamber and a planar surface mating in abutting relation with a corresponding planar surface of the other assembly in a plane substantially parallel to but intermediate said end wall portions, an extrusion cavity formed in each assembly with an inlet mouth in the face thereof engaging its respective end wall of the chamber and adapted to communicate with one of the tubers, said cavity extending generally inward from the inlet mouth and downward toward a corner of the assembly at its mating abutting surface and terminating in an outlet nozzle adjacent the latter said corner, each said assembly being formed of two parts mating along two angular intersecting planar surfaces that extend generally in the direction of the axis of said cavity, and means fastening each said block assembly rigidly in said chamber for removal therefrom independently of the other block assembly.

2. A duplex die head for connection between a pair of substantially axially opposed tubers for forming and uniting strips of plastic material issuing from said tubers, said die head comprising a pair of axially opposed end wall portions for attachment to the tubers, a pair of side wall portions formed separate from said end wall portions but disposed to extend in spaced relation between said end wall portions, means removably connecting said side wall portions to said end wall portions to define a chamber, two cavity block assemblies removably disposed in said chamber in abutting relation, each assembly having a cavity therein for conducting plastic issuing from its respective tuber to a discharge nozzle with which the cavity of the other assembly also communicates, and means fastening each said block assembly rigidly within said chamber for removal independently of the other assembly.

3. A duplex die head for connection between a pair of substantially axially opposed tubers for forming and uniting strips of plastic material issuing from said tubers, said die head comprising a pair of axially opposed end wall portions for attachment to the tubers, each said end wall portion having an opening therethrough communicating with the discharge of its respective tuber, a pair of side wall portions formed separate from said end wall portions and extending in spaced relation to each other between said end wall portions and each being removably connected to said end wall portions, said end wall and side wall portions being assembled to define a chamber with substantially planar interior walls, two opposed cavity block assemblies in said chamber, said chamber having an opening on one side for receiving said cavity block assemblies and means on said wall portions for supporting said assemblies therein, each said cavity block assembly having planar outer walls snugly engaging adjacent corresponding interior planar walls of said chamber and having a planar surface mating in abutting relation with a corresponding planar surface of the other assembly in a plane substantially parallel to but intermediate said end wall portions, an extrusion cavity formed in each assembly with an inlet mouth registering with said opening of its respective end wall of the chamber and thus to communicate with one of the tubers and with a passageway through said assembly extending generally inward from the inlet mouth and downward toward a corner of the assembly at its mating abutting surface and terminating in an outlet nozzle adjacent the latter said corner, and each said assembly being divided along two angular intersecting planar surfaces that extend generally in the direction of the axis of said cavity, and means fastening each said block assembly rigidly within said chamber for removal therefrom independently of the other assembly.

4. The apparatus of claim 3 wherein the inner walls of said opposed end portions converge gradually toward one another from said assembly-receiving open side of said chamber.

5. The apparatus of claim 3 wherein said fastening means for each said block assembly includes a key engaged with one said side wall portion of said chamber and jointly engaged with both said cavity block assemblies at regions of the adjacent sides of said assemblies at said mating surfaces thereof.

6. For an apparatus according to claim 3, a die block assembly for converting a single generally circular stream of plastic stock from a tuber into two ribbons of stock, said die block in assembled condition having four external planar side surfaces between opposing top and bottom surfaces, an inlet mouth substantially round in cross section opening into one of said side surfaces, said die block being formed with a stock separator beginning axially inwardly of said mouth, said separator having portions progressively projecting radially inwardly from opposed walls of the cavity until the portions meet thereby forming two cavities, said cavities becoming progressively wider and narrower and of progressively smaller cross sectional area toward an outlet in the bottom surface thereof to smoothly convert the stock into ribbons under controlled flow conditions.

7. For an apparatus according to claim 3, a die block assembly for extruding plastic stock comprising in assembled condition a substantially rectangular elongated metal block having four external planar side surfaces between opposing top and bottom surfaces, a die cavity in said assembly having an inlet mouth opening into one of said side surfaces, said cavity extending in a direction generally across said block for a distance and then turning toward an outlet adjacent one corner at the bottom of the block opposite said face having the inlet opening, said block assembly being formed in two sections mating along two planes that substantially coincide with said die cavity axis and with portions of the cavity formed in each said sections.

References Cited in the file of this patent

UNITED STATES PATENTS

| | | |
|---|---|---|
| 1,952,469 | Snyder et al. | Mar. 27, 1934 |
| 2,096,362 | Lehman | Oct. 19, 1937 |
| 2,444,831 | Kilborn | July 6, 1948 |
| 2,569,373 | Fay | Sept. 25, 1951 |